United States Patent
Bassett et al.

(10) Patent No.: US 10,162,784 B2
(45) Date of Patent: Dec. 25, 2018

(54) ADAPTER FOR TRANSMITTING SIGNALS

(71) Applicant: Hewlett-Packard Development Company, L.P., Houston, TX (US)

(72) Inventors: Jonathan D. Bassett, Fort Collins, CO (US); Byron A. Alcorn, Fort Collins, CO (US); Shane Ward, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 44 days.

(21) Appl. No.: 15/116,155

(22) PCT Filed: Feb. 19, 2014

(86) PCT No.: PCT/US2014/017150
§ 371 (c)(1),
(2) Date: Aug. 2, 2016

(87) PCT Pub. No.: WO2015/126383
PCT Pub. Date: Aug. 27, 2015

(65) Prior Publication Data
US 2017/0177537 A1 Jun. 22, 2017

(51) Int. Cl.
*G06F 13/36* (2006.01)
*G06F 13/38* (2006.01)
(Continued)

(52) U.S. Cl.
CPC .......... *G06F 13/4072* (2013.01); *G06F 13/36* (2013.01); *G06F 13/385* (2013.01);
(Continued)

(58) Field of Classification Search
None
See application file for complete search history.

(56) References Cited

U.S. PATENT DOCUMENTS 6,338,107 B1    1/2002    Neal et al.
6,438,638 B1 *   8/2002    Jones ...................... G06F 13/38
                                                              710/301
(Continued)

FOREIGN PATENT DOCUMENTS

CN           203102076       7/2013

OTHER PUBLICATIONS

"DSA Shows the Adapter for a Mezzanine Slot That Has Multiple PCI Bridges as "on-board" When It is Plugged into a PCI Slot—IBM Flex System X240 Compute Node (8737)," Jan. 15, 2013, pp. 1-2, IBM.

(Continued)

*Primary Examiner* — Elias Mamo
(74) *Attorney, Agent, or Firm* — HP Inc. Patent Department

(57) ABSTRACT

Examples of adapters for transmitting signals are disclosed. In one example implementation according to aspects of the present disclosure, an adapter may include a first connector communicatively couplable to PCIe port of a computing system via a first plurality of pins and a second connecter communicatively couplable to an electronic device via a second plurality of pins. The first plurality of pins is communicatively coupled to the second plurality of pins. Additionally, signals of a first type are transmittable between the computing system and the electronic device via a first subset of the first and the second pluralities of pins and signals of a second type are transmittable between the computing system and the electronic device via a second subset of the first and the second pluralities of pins. The second subset of the first plurality of pins and the second plurality of pins conforms to the SFF 8639 standard.

14 Claims, 2 Drawing Sheets

(51) Int. Cl.
*G06F 13/40* (2006.01)
*G06F 13/42* (2006.01)

(52) U.S. Cl.
CPC ........ *G06F 13/409* (2013.01); *G06F 13/4282* (2013.01); *G06F 2213/0026* (2013.01)

(56) References Cited

U.S. PATENT DOCUMENTS

| | | | | |
|---|---|---|---|---|
| 6,725,286 | B2* | 4/2004 | Takahashi | G11C 5/063 710/11 |
| 7,555,582 | B2* | 6/2009 | Lambert | G11C 5/005 710/62 |
| 7,779,184 | B2* | 8/2010 | Hubert | G06F 13/1684 710/38 |
| 8,390,324 | B2* | 3/2013 | Fletcher | H03K 19/177 326/39 |
| 2006/0046534 | A1 | 3/2006 | Birmingham | |
| 2007/0016711 | A1* | 1/2007 | Yang | G06F 3/14 710/301 |
| 2007/0270038 | A1* | 11/2007 | Liu | G06K 7/0013 439/630 |
| 2010/0077117 | A1 | 3/2010 | Asnaashari | |
| 2011/0063308 | A1 | 3/2011 | Hunkins et al. | |
| 2012/0250245 | A1 | 10/2012 | Utz et al. | |
| 2013/0031288 | A1 | 1/2013 | Richard | |
| 2013/0160002 | A1 | 6/2013 | Graham et al. | |

OTHER PUBLICATIONS

Wiedemeier, John. "Testing for PCIe SSD Compatibility and Performance," Jan. 20, 2014, pp. 1-25, Teledyne Lecroy.

\* cited by examiner

ADAPTER FOR TRANSMITTING SIGNALS

CROSS-REFERENCE TO RELATED APPLICATION

This application is a U.S. National Stage Application of and claims priority to International Patent Application No. PCT/US2014/017150, filed on Feb. 19, 2014, and entitled "ADAPTER FOR TRANSMITTING SIGNALS," which is hereby incorporated by reference in its entirety.

BACKGROUND

Computing systems such as workstations, desktops, laptops, tablets, mobile phones, etc. have become ubiquitous with users of these systems frequently and increasingly using the systems. As the presence of these systems has grown, so too have the demands for performance and flexibility of the computing systems. Users frequently desire to add additional components, devices, or peripherals to the computing systems.

BRIEF DESCRIPTION OF THE DRAWINGS

The following detailed description references the drawings, in which.

DETAILED DESCRIPTION

Figure 1:
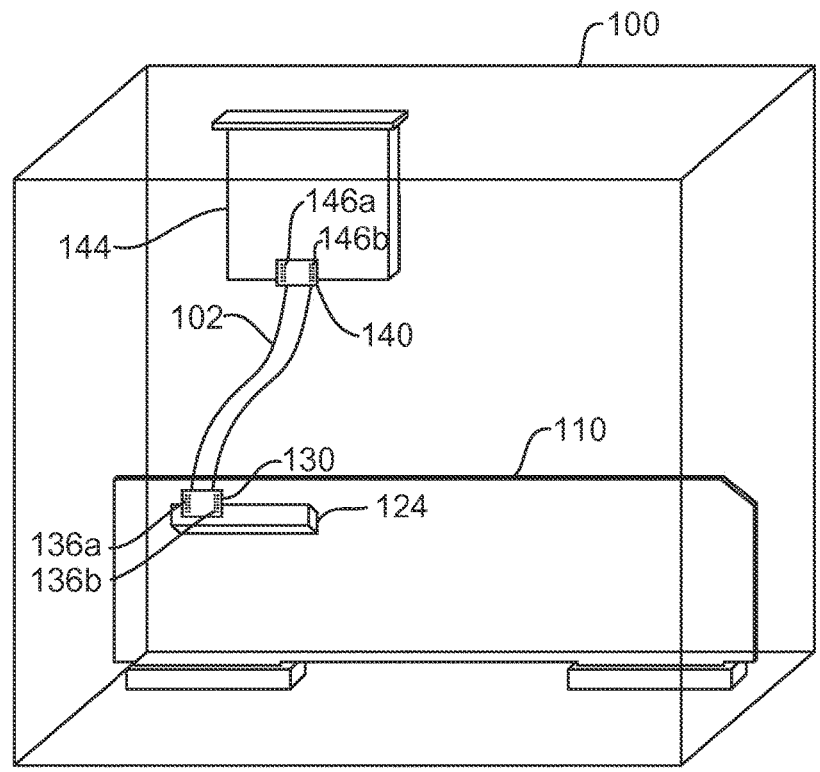
FIG. 1 illustrates a block diagram of a computing system for an adapter for routing signals according to examples of the present disclosure.

Computing systems often utilize Peripheral Component Interconnect (PCI) and/or Peripheral Component Interconnect Express (PCIe) interfaces for connecting devices to the computing system. For example, a computing system may include a PCI and/or PCIe interface board for connecting devices to the computing system. The computing system manufacturer or the user of the computing system may connect a device, such as a disk drive, audio card, video card, network card, or other similar device to the PCI and/or PCIe interface board, depending on the type of device. Throughout this disclosure, reference will be made to PCIe type interfaces, which should be understood to include both PCI and PCIe type interfaces and devices, and the use of the term "PCIe" without reference to the term "PCI" (and vice versa) should not be seen as limiting.

In many existing computing systems, the PCIe interface board may include one or more PCIe slots for connecting PCIe devices. These slots may accommodate a variety of different connections and bandwidths, typically denoted by the number of lanes of communication capacity they provide. For example, an x1 slot contains four wires making up one lane, while an x2 slot contains eight wires making up two lanes. Other examples include an x4 slot (4 lanes), an x8 slot (8 lanes), an x12 slot (12 lanes), an x16 slot (16 lanes), and an x32 slot (32 lanes). Many computing systems provide multiple slots with preconfigured number of lanes for connecting devices. For example, a computing system may include one x4 slot, two x8 slots, and two x16 slots.

There are a variety of PCIe device—particularly PCIe solid state storage devices such as M.2 and SFF-8639 devices—that utilize and rely on PCIe system lanes. However, these devices connect to the host computing system using different interfaces than the general-purpose PCIe slots commonly included in the PCIe printed circuit assembly (PCA) found in many computing systems. Typically, a PCA is a printed circuit assembly which describes a printed circuit board loaded with components such as an I/O hub and a fixed number of PCIe lanes. Because the number of PCIe lanes is fixed, dedicating a PCIe lane to one specific device type by using a device specific connecter would reduce the flexibility for connecting other device types to other PCIe lanes. At the same time, it would increase system cost to include specific device connectors instead of (or in addition to) the more generic PCIe slots.

Manufacturers of computing devices and systems must determine how to allocate system resources, and particular PCIe lanes, to make the best use of the limited PCIe lanes. These new types of devices connect to the computing system via a variety of different interfaces than the general-purpose PCIe connection.

Presently, a PCA is designed with dedicated lanes and slots for general-purpose PCIe slots, an M.2 slot, an SFF 8639 slot, and/or a cabled SSD slot. In a typical implementation, a given PCIe lane on a computing system is routed to a dedicated socket (e.g., PCIe socket, M.2 socket, or SFF-8639 socket), and the given PCIe lane is dedicated to supporting only that one device type. Currently, manufacturers of computing systems choose to support one type of device, and in doing so eliminate support of the others. In some computing systems, the PCAs rely on multiplexers to route signals to a desired device connected to a general purpose PCIe slot of the PCA.

Various implementations are described below by referring to several examples of an adapter for routing signals such as between a PCIe lane and a PCIe device, such as M.2, SFF 8639, SATA, and SATAe devices. In one example implementation according to aspects of the present disclosure, an adapter may include a first connector communicatively couplable to a peripheral component interconnect express (PCIe) port of a computing system via a first plurality of pins and a second connecter communicatively couplable to an electronic device via a second plurality of pins. The first plurality of pins is communicatively coupled to the second plurality of pins. Additionally, signals of a first type are transmittable between the computing system and the electronic device via a first subset of the first and the second pluralities of pins and signals of a second type are transmittable between the computing system and the electronic device via a second subset of the first and the second pluralities of pins. The second subset of the first plurality of pins and the second plurality of pins conforms to the SFF 8639 standard. In an example, the adapter operates without implementing any additional logic, such as a multiplexer, decoder, microprocessor, etc.

In some implementations, a variety of PCIe compatible devices are supported in a way that maximizes system flexibility while minimizing cost. In this way, a computing system provides flexibility with minimum cost. These and other advantages will be apparent from the description that follows.

FIG. 1 illustrates a block diagram of a computing system 100 for an adapter 102 for routing signals between a PCIe lane of a PCIe slot 124 on a system board 110 of the computing system 100 and an electronic device 144 according to examples of the present disclosure. FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as one or more software modules, hardware modules, special-purpose hardware (e.g. application specific hardware, application specific integrated circuits (ASICs), embedded controllers, hardwired circuitry, etc.), or some combination of these.

It should be understood that the computing system 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. The electronic device 144 may be any appropriate type of peripheral device, such as M.2 device (e.g., an M.2 storage device or SSD, an M.2 network device such as a LAN or WLAN device, etc.) or an SFF 8639 device (e.g. an SFF 8639 storage device or SSD), including network cards, storage devices, and the like.

In one example, the computing system 100 includes a system board 110 (e.g., a motherboard, mainboard, planar board, and logic board) that holds various system hardware such as processors, memories, networking cards, video cards, audio cards, etc. (not shown) and provides communicative connections for peripherals and other devices. The system board 110 also includes a peripheral component interconnect express slot 124 for correcting the peripherals and other devices. The PCIe slot 124 may be of various lane sizes (e.g., x1, x2, x4, x8, x16, etc.). In other examples, additional PCIe slots may be included and may also vary in lane size.

The adapter 102 may be communicatively coupled between the PCIe slot 124 of the system board 110 and the electronic device 114. In the example shown, a first connector 130 of the adapter 102 is communicatively coupled to the PCIe port 124 of the system board 110 via a first plurality of pins 136a,b. A second connector 140 of the adapter 102 is communicatively coupled to the electronic device 144 via a second plurality of pins 146a,b. It should be understood that communicatively coupled includes being electronically coupled such that signals may be transmitted across the coupling. In examples, communicatively coupled may also include being physically coupled such that two physically are joined together.

Continuing with the example shown in FIG. 1, the first plurality of pins 136a,b is communicatively coupled to the second plurality of pins 146a,b such that signals may be sent through the adapter 102 between the first plurality of pins 136a,b and the second plurality of pins 146a,b. The first plurality of pins 136a,b includes a first subset of pins 136a and a second subset of pins 136b. Likewise, the second plurality of pins 146a,b includes a first subset of pins 146a and a second subset of pins 146b. The first set of pins 136a is communicatively coupled to the first set of pins 146a while the second set of pins 136b is communicatively coupled to the second set of pins 146b. The pins 136a,b and 146a,b may be connected electrically or optically as appropriate.

Signals may be transmitted and received between the system board 110 and the electronic device 144 via the adapter 102. In particular, signals of a first type, such as M.2 compliant signals, are transmittable between the computing system 100 and the electronic device 144 via the first subset of the first and the second pluralities of pins 136a and 146a. In one example, if the electronic device 144 is an M.2 compliant device, the second subset of the first and the second pluralities of pins 136b and 146b may be unused to transmit the signal. In one example, the second subset of the first and the second pluralities of pins 136b and 146b are connected to the PCIe slot 124 and the electronic device 144 but are not utilized to transmit the signal of the first type.

In another example, if the electronic device 144 is an SFF 8639 device, signals of a second type, such as SFF 8639 compliant signals, are transmittable between the computing system 100 and the electronic device 144 via the second subset of the first and the second pluralities of pins 136b and 146b. The signal (or a portion of the signal) may also be transmittable between the computing system 100 and the electronic device 144 via the first subset of the first and the second pluralities of pins 136a and 146a. In this example, both the first subset and the second subset of the first and second pluralities of pins 136a,b and 146a,b are utilized. Other suitable devices may also be connected as the electronic device 140, including M.2, SFF 8639, SATA, and SATAe devices.

FIG. 2 illustrates a block diagram of an adapter 102 for routing signals according to examples of the present disclosure according to examples of the present disclosure. The adapter 102 may be communicatively coupled between a PCIe slot of a system board of a computing device and an electronic device as shown in FIG. 1. In FIG. 1, the adapter 102 is shown as a cable; however, as shown in FIG. 2, the adapter 102 may also be a solid adapter such that the adapter 102 is a small chip or board that may be connected between the computing device's system board and the electronic device to be connected to the system board. It should be understood that these are merely examples and that other suitable physical configurations are possible without deviating from the functionality or purpose of the adapter.

In the example shown in FIG. 2, a first connector 130 of the adapter 102 is communicatively coupled to the PCIe port of the system board via a first plurality of pins 136a,b. A second connector 140 of the adapter 102 is communicatively coupled to the electronic device via a second plurality of pins 146a,b. It should be understood that communicatively coupled includes being electronically coupled such that signals may be transmitted across the coupling. In examples, communicatively coupled may also include being physically coupled such that two physically are joined together.

Continuing with the example shown in FIG. 2, the first plurality of pins 136a,b is communicatively coupled to the second plurality of pins 146a,b such that signals may be sent through the adapter 102 between the first plurality of pins 136a,b and the second plurality of pins 146a,b. The first plurality of pins 136a,b includes a first subset of pins 136a and a second subset of pins 136b. Likewise, the second plurality of pins 146a,b includes a first subset of pins 146a and a second subset of pins 146b. The first set of pins 136a is communicatively coupled to the first set of pins 146a while the second set of pins 136b is communicatively coupled to the second set of pins 146b. The pins 136a,b and 146a,b may be connected electrically or optically as appropriate.

Signals may be transmitted and received between the system board and the electronic device via the adapter 102. In particular, signals of a first type, such as M.2 compliant signals, are transmittable between the computing system and the electronic device via the first subset of the first and the second pluralities of pins 136a and 146a. In one example, if the electronic device is an M.2 compliant device, the second subset of the first and the second pluralities of pins 136b and 146b may be unused to transmit the signal. In one example, the second subset of the first and the second pluralities of pins 136b and 146b are connected to the PCIe slot and the electronic device but are not utilized to transmit the signal of the first type. However, in other examples, at least one of the second subset of the first and the second pluralities of pins 136b and 146b is not connected to the PCIe slot and/or the electronic device.

In another example, if the electronic device is an SFF 8639 device, signals of a second type, such as SFF 8639 compliant signals, are transmittable between the computing system 100 and the electronic device via the second subset of the first and the second pluralities of pins 136b and 146b. The signal (or a portion of the signal) may also be transmittable between the computing system and the electronic device via the first subset of the first and the second pluralities of pins 136a and 146a. In this example, both the first subset and the second subset of the first and second pluralities of pins 136a,b and 146a,b are utilized. Other suitable devices may also be connected as the electronic device, including M.2, SFF 8639, SATA, and SATAe devices.

When an SFF 8639 device is attached, both the first and second subsets of the first and the second pluralities of pins 136a,b and 146a,b may be physically attached to the SFF 8639 device and may be used to transmit signals between the computing system and the SFF 8639 device. That is, both the first and second subsets of the first and the second pluralities of pins 136a,b and 146a,b may be used in communicating between the computing system and the SFF 8639 device. However, when an M.2 device is used, the first subset of the first and the second pluralities of pins 136a and 146a are used. In the case where an M.2 device is implemented, the second subset of the first and the second pluralities of pins 136b and 146b are unused.

Figure 2A:
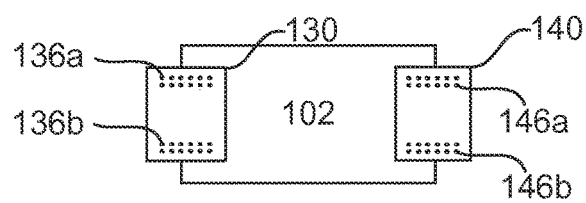
FIGS. 2A and 2B illustrate block diagrams of adapters for routing signals according to examples of the present disclosure.
Figure 2B:
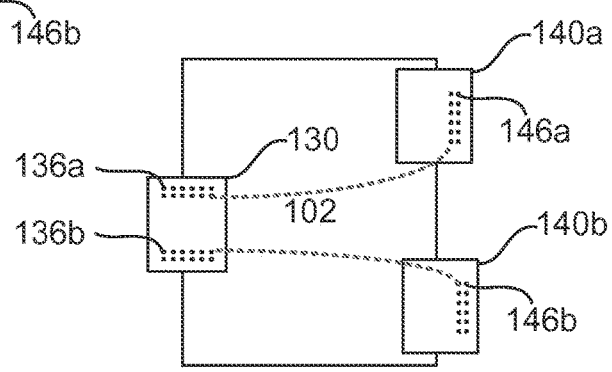

In examples, the first and second subsets of the first and the second pluralities of pins 136a,b and 146a,b may be exist on separate physical connectors for connecting to the electronic device (e.g., M.2 device, SF 8639 device, etc.), as shown in FIG. 2B. For example, in FIG. 2B the adapter 102 includes a first connector 130 communicatively couplable to the PCIe port 124 of the system board 110 of FIG. 1 via the first plurality of pins 136a,b. A second connector 140a and a third connector 140b of the adapter are communicatively couplable to an electronic device such as electronic device 144 of FIG. 1. In the example shown, the second connector 140a may conform to the M.2 standard such that it is couplable to an M.2 device while the third connector 140b may conform to the SFF 8639 standard such that it is couplable to an SFF 8639 device.

The first plurality of pins 136a and 136b are electronically mapped (as illustrated by the dotted lines) to the second plurality of pins 146a (on the second connector 140a) and 146b (on the third connector 146b) respectively. In this way, either an M.2 compliant device or an SFF 8639 compliant device may be communicatively coupled to the adapter 102.

Figure 3:
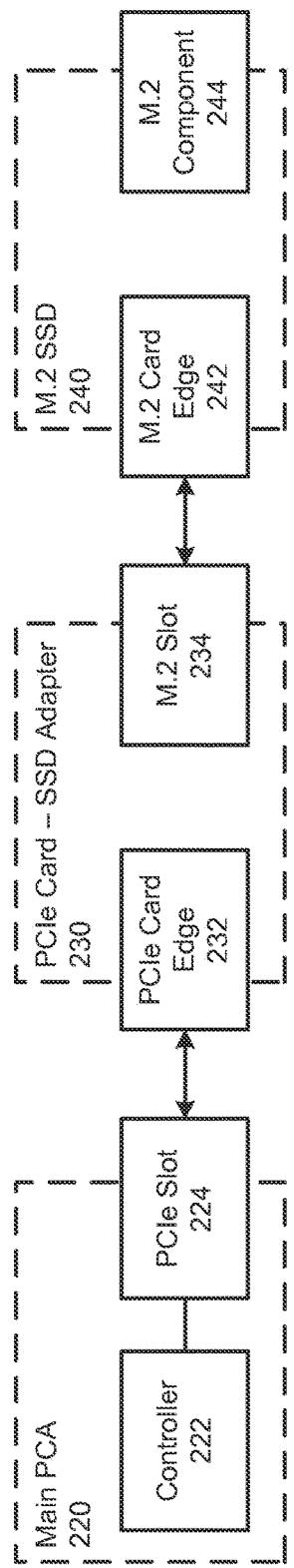
FIG. 3 illustrates a block diagram of an adapter for routing signals according to examples of the present disclosure.

FIG. 3 illustrates a block diagram of an adapter for routing signals according to examples of the present disclosure. In particular, FIG. 3 illustrates a PCA board 220, a PCIe card adapter 230, and an M.2 SSD device 240.

The PCA board 220 is connected directly to (or is manufactured as part of) the computing system's system board and is responsible for facilitating the transfer of data via the computing system and attached PCIe devices. In this example, the PCA board 220 includes a controller 222 and a PCIe slot 224. The controller 222 handles the data communication functionality, including sending and receiving data. The attached PCIe devices connect, either directly or indirectly, to the PCIe slot 224. It should be understood that, although one PCIe slot 224 is shown, additional PCIe slots may be implemented. Data transmitted through these PCIe slots such as PCIe slot 224 may be controlled by the controller 222 or by an additional controller or controllers.

In this example, the PCIe card adapter 230 connects to the PCIe slot 224 of the PCA board 220 via a PCIe card edge 232, which communicatively couplable (and in many cases physically couplable) to the PCIe slot 224. This may include a standard PCIe interface configuration. The PCIe card 230 also includes an M.2 slot 234 for connecting an M.2 device such as M.2 SSD device 240.

The M.2 SSD device 240 includes an M.2 card edge 242 for communicatively (and possibly physically) coupling the M.2 SSD device to the M.2 slot 234 of the PCIe card adapter 230, in this example, an M.2 SSD device is illustrated and discussed. However, it should be understood that any suitable device, such as other M.2 devices or an SFF 8639 device may be implemented.

Like FIGS. 1 and 2, the PCIe card edge 232 of the PCIe card adapter 230 is communicatively coupled to the PCIe port of the system board via a first plurality of pins (not shown). The M.2 slot 234 of the PCIe card adapter 230 is communicatively coupled to the M.2 device 240 via a second plurality of pins (not shown). It should be understood that communicatively coupled includes being electronically coupled such that signals may be transmitted across the coupling. In examples, communicatively coupled may also include being physically coupled such that two physically are joined together.

In an example, the first plurality of pins is communicatively coupled to the second plurality of pins such that signals may be sent through the adapter 230 between the first plurality of pins and the second plurality of pins. The first plurality of pins includes a first subset of pins and a second subset of pins. Likewise, the second plurality of pins includes a first subset of pins and a second subset of pins. The first set of pins is communicatively coupled to the first set of pins while the second set of pins is communicatively coupled to the second set of pins. The pins and may be connected electrically or optically as appropriate.

Signals may be transmitted and received between the system board and the M.2 device 240 via the PCIe card adapter 230. In particular, signals of a first type, such as M.2 compliant signals, are transmittable between the PCA board 220 and the M.2 device 240 via the first subset of the first and the second pluralities of pins. In one example, the second subset of the first and the second pluralities of pins and may be unused to transmit the signal to the M.2 device 230. In one example, the second subset of the first and the second pluralities of pins are connected to the PCIe slot 224 and the M.2 device 240 but are not utilized to transmit the signal of the first type.

Figure 4:
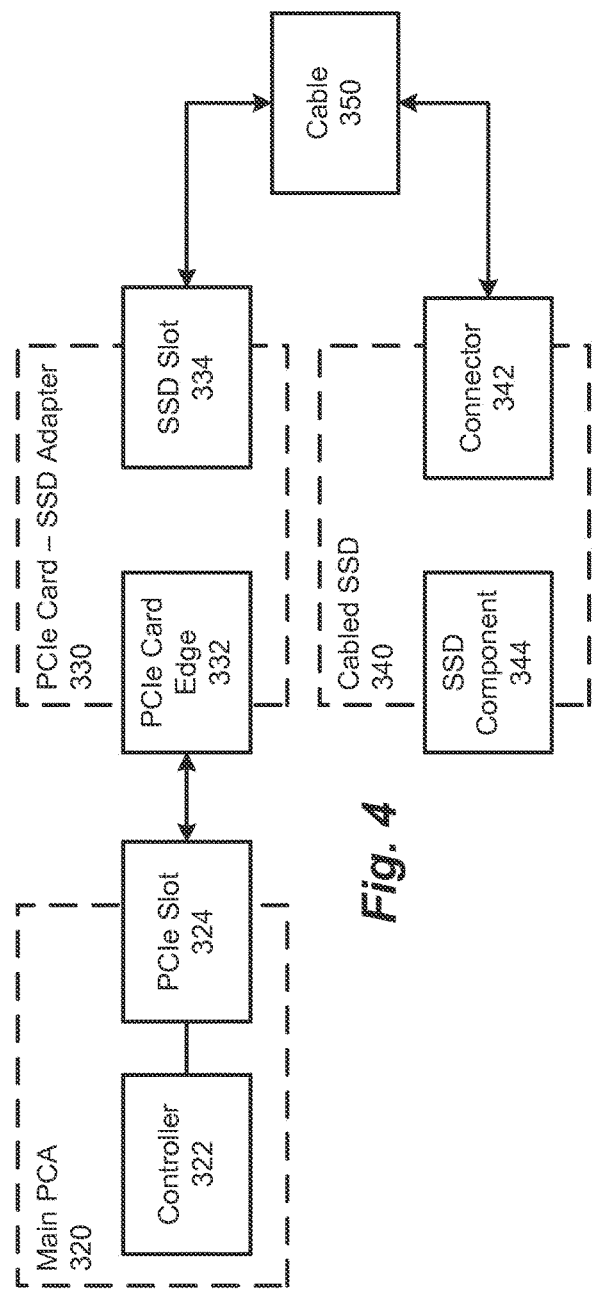
FIG. 4 illustrates a block diagram of an adapter for routing signals according to examples of the present disclosure.

FIG. 4 illustrates a block diagram of an adapter for routing signals according to examples of the present disclosure. In particular, FIG. 3 illustrates a PCA board 320, a PCIe card adapter 330, an SSD device 340, and a cable 350.

The PCA board 320 is connected directly to (or is manufactured as part of) the computing system's system board and is responsible for facilitating the transfer of data via the computing system and attached PCIe devices. In this example, the PCA board 320 includes a controller 322 and a PCIe slot 324. The controller 322 handles the data communication functionality, including sending and receiving data. The attached PCIe devices connect, either directly or indirectly, to the PCIe slot 324. It should be understood that, although one PCIe slot 324 is shown, additional PCIe slots may be implemented. Data transmitted through these PCIe slots such as PCIe slot 324 may be controlled by the controller 322 or by an additional controller or controllers.

In this example, the PCIe card adapter 330 connects to the PCIe slot 324 of the PCA board 320 via a PCIe card edge 332, which is configured to communicatively couple (and in many cases physically couple) to the PCIe slot 324. This may include a standard PCIe interface configuration. The PCIe card 330 also includes an SSD slot 334 for connecting an SSD device such as M.2 SSD device or an SFF 8639 device.

The SSD device 340 includes a connector 342 for communicatively (and possibly physically) coupling the SSD device to the M.2 slot 334 of the PCIe card adapter 330. In this example, a cable 350 is disposed between the SSD slot 334 of the PCIe card 330 and the connector 342 of the SSD device 340. In this way, the SSD device 340 may be placed remotely from the PCIe card adapter 330, such as in another part of the computing system. Such an example is shown in FIG. 1. This arrangement enables the SSD device 340 to be placed in a more convenience location than may be possible without the cable 350.

Like FIGS. 1, 2A, and 2B, the PCIe card edge 332 of the PCIe card adapter 330 is communicatively coupled to the PCIe port of the system board via a first plurality of pins (not shown). The M.2 slot 334 of the PCIe card adapter 330 is communicatively coupled to the M.2 device 340 via a second plurality of pins (not shown). It should be understood that communicatively coupled includes being electronically coupled such that signals may be transmitted across the coupling. In examples, communicatively coupled may also include being physically coupled such that two physically are joined together.

In an example, the first plurality of pins is communicatively coupled to the second plurality of pins such that signals may be sent through the adapter 330 between the first plurality of pins and the second plurality of pins. The first plurality of pins includes a first subset of pins and a second subset of pins. Likewise, the second plurality of pins includes a first subset of pins and a second subset of pins. The first set of pins is communicatively coupled to the first set of pins while the second set of pins is communicatively coupled to the second set of pins. The pins and may be connected electrically or optically as appropriate. It should also be understood that the cable 350 may include the first and second plurality of pins as well as the first and second subsets of the first and second pluralities of pins.

Signals may be transmitted and received between the system board and the SSD device via the PCIe card adapter 330. In particular, signals of a first type, such as M.2 compliant signals, are transmittable between the PCA board 320 and the M.2 device via the first subset of the first and the second pluralities of pins. In one example, the second subset of the first and the second pluralities of pins and may be unused to transmit the signal to the M.2 device 330. In one example, the second subset of the first and the second pluralities of pins are connected to the PCIe slot 324 and the SSD device 340 but are not utilized to transmit the signal of the first type.

In another example, if the SSD device is an SFF 8639 device, signals of a second type, such as SFF 8639 compliant signals, are transmittable between the main PCA board 320 and the SSD device 340 via the second subset of the first and the second pluralities of pins. The signal (or a portion of the signal) may also be transmittable between the main PCA board 320 and the SSD device 340 via the first subset of the first and the second pluralities of pins and the cable 350 (although the cable 350 is not be utilized in some examples). In this example, both the first subset and the second subset of the first and second pluralities of pins are utilized. Other suitable devices may also be connected as SSD devices 350, including M.2, SFF 8639, SATA, and SATAe devices.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. An adapter comprising:
   a first connector communicatively couplable to a peripheral component interconnect express (PCIe) port of a computing system via a first plurality of pins; and
   a second connecter communicatively couplable to an electronic device via a second plurality of pins,
      wherein the first plurality of pins is communicatively coupled to the second plurality of pins,
      wherein signals of a first type are transmittable between the computing system and the electronic device via a first subset of the first and the second pluralities of pins,
      wherein signals of a second type are transmittable between the computing system and the electronic device via a second subset of the first and the second pluralities of pins, and
      wherein the second subset of the first plurality of pins and the second plurality of pins conforms to the SFF 8639 standard.

2. The adapter of claim 1, wherein the first subset of the first and the second pluralities of pins conforms to the M.2 standard.

3. The adapter of claim 2, wherein the electronic device is an M.2 compliant device.

4. The adapter of claim 3, wherein the second subset of the first and the second pluralities of pins is unused when the signals of the first type are transmitted between the computing system and the M.2 compliant device.

5. The adapter of claim 1, wherein the electronic device is an SFF 8639 compliant device.

6. The adapter of claim 5, wherein the second subset of the first plurality and the second pluralities of pins is used when the signals of the second type are transmitted between the computing system and the SFF 8639 compliant device.

7. The adapter of claim 1, wherein the signals of the first type are M.2 compliant and wherein the signals of the second type are SFF 8639 compliant.

8. The adapter of claim 1, wherein the electronic device is selected from the group consisting of an M.2 SSD device, an M.2 WLAN device, and an SFF-8639 SSD device.

9. An adapter comprising:
   a first connector communicatively couplable to a peripheral component interconnect express (PCIe) port of a computing system via a first plurality of pins; and a second connecter communicatively couplable to one of an M.2 compliant device and an SFF 8639 compliant device via a second plurality of pins, wherein the first plurality of pins is communicatively coupled to the second plurality of pins, wherein, when the second connector is communicatively coupled to the M.2 compliant device, signals of a first type are transmittable between the computing system and the M.2 compliant device via a first subset of the first and the second pluralities of pins, and wherein, when the second connector is communicatively coupled to the SFF 8639 compliant device, signals of a second type are transmittable between the computing system and the SFF 8639 compliant device via the first subset of the first and the second pluralities of pins and a second subset of the first and the second pluralities of pins.

10. The adapter of claim 9, wherein the signals of the first type are M.2 compliant and wherein the signals of the second type are SFF 8639 compliant.

11. The adapter of claim 9,
wherein the first subset of the first and the second pluralities of pins conforms to the M.2 standard.

12. The adapter of claim 11,
wherein the signals of the first type are M.2 compliant, and
wherein the signals of the second type are SFF 8639 compliant.

13. A computing system comprising:
a circuit board having a peripheral component interconnect express (PCIe) slot;
an electronic device; and
an adapter having a first connector communicatively couplable to the PCIe slot via a first plurality of pins and a second connecter communicatively couplable to the electronic device via a second plurality of pins, wherein the first plurality of pins is communicatively coupled to the second plurality of pins, wherein signals of a first type are transmittable between the computing system and the electronic device via a first subset of the first and the second pluralities of pins, wherein the second subset of the first and the second pluralities of pins is unused when the signals of the first type are transmitted between the computing system and the electronic device when the electronic device is an M.2 compliant device, and wherein signals of a second type are transmittable between the computing system and the electronic device via the first subset and a second subset of the first and the second pluralities of pins.

14. The computing system of claim 13, wherein the first subset of the first and the second pluralities of pins conforms to the M.2 standard, and wherein the second subset of the first plurality of pins and the second plurality of pins conforms to the SFF 8639 standard.

* * * * *